Aug. 17, 1965 P. S. ROSBERGER 3,200,689
KEYBOARD
Filed April 2, 1964 3 Sheets-Sheet 1

INVENTOR.
PAUL S. ROSBERGER
BY
Philip S. Hilbert
ATTORNEY.

Aug. 17, 1965 P. S. ROSBERGER 3,200,689

KEYBOARD

Filed April 2, 1964 3 Sheets-Sheet 2

INVENTOR.
PAUL S. ROSBERGER

BY Philip S. Hilbert

ATTORNEY.

INVENTOR.
PAUL S. ROSBERGER
BY Philip S. Hilbert
ATTORNEY.

United States Patent Office 3,200,689

Patented Aug. 17, 1965

3,200,689

KEYBOARD

Paul S. Rosberger, 260 Parker Ave., Maplewood, N.J.

Filed Apr. 2, 1964, Ser. No. 356,876
14 Claims. (Cl. 84—423)

This invention relates to keyboards and more particularly concerns keyboards including keys for actuating or controlling the operation of elements such as the note producing means of a piano or the like.

In connection with piano keyboards, there has been a long recognized desire to simplify conventional keyboard arrangements so that all musical scale of a given type may be fingered identically, regardless of their tonic note. Also, all intervals and chords of the same type will have an identical span or reach, varying only by their relative positions on the keyboard. To achieve such ends, various types of wholetone keyboards have been proposed, but such keyboards are difficult to finger since they are constituted of several rows of keys in adjacent relationship. Since at least two rows of keys are required for such keyboards to be chromatically complete and at least three rows of keys are required, complex fingering patterns arise.

Accordingly, an object of this invention is to provide an improved keyboard distinguished by fingering standardization of the various keys of a given scale and its related chords and intervals, such keyboard being relatively simple as compared to proposed wholetone keyboards, such keyboard being distinguished by a single row of keys all on a single level and of easy access, wherein the individual keys are fingered in pairs to produce a given note and where the individual keys have a width greater than the thickness of a performer's thinnest finger and a pair of adjacent keys have a total width greater than the thickness of a performer's thickest finger.

If all the keys of a keyboard having but a single row of keys were of the same width as that of a conventional natural key on usual keyboards, and such keys were arranged chromatically, the resultant keyboard would be of excessive length and the reach of the keys to the hand would be impractical.

Accordingly, a further object of this invention is to provide an improved keyboard, wherein all the keys, both naturals and accidentals are in a single row and in side by side arrangement, each of the keys being of somewhat reduced width as compared to the width of conventional natural keys, and which by reason of their abutting relation give a positive touch to the fingering thereof; the resultant keyboard having a total length equal to or somewhat less than the length of a conventional keyboard; such keys being adapted to be fingered in pairs rather than as single keys, thereby avoiding fingering problems.

Another object of this invention is to provide an improved piano keyboard having all of its keys in a single row and of individually reduced width, suitable means being provided for connecting the keys in successive pairs to the respective note producing means of the instrument action whereby each key may be one element of two pairs of keys respectively actuating different note producing means.

A further object of this invention is to provide a piano keyboard of the character described, wherein all the keys are in a single row and of reduced width so that the keys are readily fingered in pairs for simultaneous depression, each key being adapted to be paired with the key on one side thereof to actuate one note producing means or to be paired with the key on the other side thereof to actuate another note producing means.

Still another object of this invention is to provide in combination with the novel keyboard of the character described, simple means for selectively associating each key with the keys on either side thereof whereby the simultaneous depression of the one key with one of the adjacent keys will actuate a single note producing means.

Still a further object of this invention is to provide a keyboard wherein any given note sounded by a pair of relevant keys corresponding to such note, following another note sounded by the appropriate pair of keys and just sounded, whether a semitone or a wholetone away from that note to either side thereof, will be an adjacent note.

Yet another object of this invention is to provide a keyboard for use with any device having a series of elements actuatable by selected keys of the keyboard, wherein any one of the elements of the device is actuated by the depression of a pair of immediately adjacent keys and any one key may be one of the keys in either of two pairs of keys respectively actuating different elements of the device.

Yet a further object of this invention is to provide an improved keyboard for a musical instrument wherein any interval of a major-second or a minor-second may be sounded simultaneously by the use of a single finger, namely the thumb of the performer.

Still a further object of this invention is to provide a keyboard for selectively actuating any one of a series of elements associated with such keyboard, wherein pairs of adjacent keys are depressed to provide for element actuation, the connection between the keys and the elements being of an improved mechanical, electrical or mechano-electrical nature.

Other objects of this invention will in part be obvious and in part hereinafter pointed out.

Essentially, in accordance with the instant invention, a keyboard for actuating tone producing means or other elements of a given mechanism associated with the keyboard, is provided with a single row of keys in side by side relation, each key being of dual function in respect to two adjacent pairs of keys respectively associated with a given tone producing means or elements, whereby the overall width of a keyboard having conventional single acting keys, is reduced. Further, the keys of this keyboard are depressed in pairs, each key being adapted to be one of two pairs of keys and the keys being connected to the note producing means or other actuable element by novel mechanical or electrical means.

Figure 1:
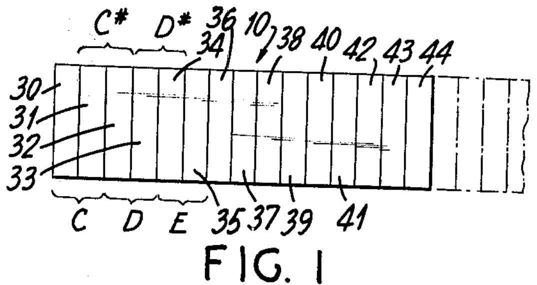
FIG. 1 is a plan view showing the single row piano keyboard embodying the invention.

As shown in FIG. 1, a piano keyboard 10 is provided in accordance with the instant invention. All of the keys, indicated at 30–44 are in a single row and side by side relation, each key being of a somewhat reduced width as compared to that of a natural key of a conventional piano keyboard. The keys 30–44 are adapted to be depressed as pairs of adjacent keys, to produce corresponding notes. Thus, the simultaneous depression of keys 30, 31 produces the note C; keys 31, 32 produce the note C♯; keys 32, 33 produce D, etc., see FIG. 1. Thus each of the keys 30–44 has a dual function since a single key may be a constituent of two pairs of adjacent keys.

Figures 2, 3, 4, 5, 6:
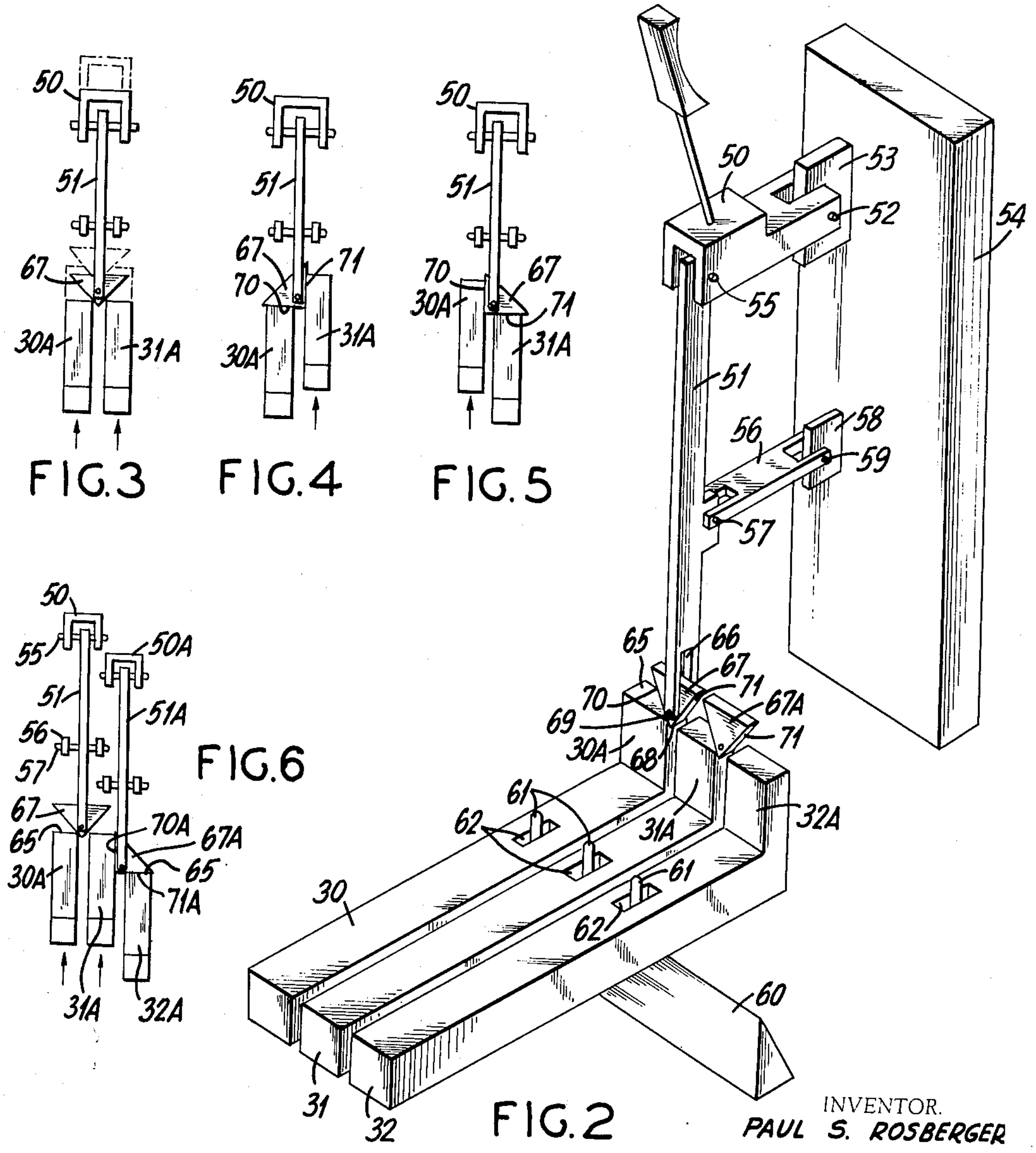
FIG. 2 is a perspective view showing the keys and associated mechanical actuating means in accordance with the invention.
FIG. 3 is a front elevational view of the wippen actuating means showing a pair of keys being simultaneously depressed.
FIG. 4 is a view similar to that of FIG. 3, showing one of the pair of keys being depressed.
FIG. 5 is a view similar to that of FIG. 4, showing the other of the keys being depressed.
FIG. 6 is a view similar to that of FIG. 3, showing the relationship of a third key in respect to the adjacent depressed pair of keys.

In FIG. 2 is shown one embodiment of the invention wherein mechanical means interconnects the keys of the keyboard 10 with the note producing means, more particularly the wippens 50 through their respectively associated abstracts 51. The wippens 50, of which only one is shown, for the purpose of clarity in illustration, are pivoted as at 52 on a block 53 secured to a conventional mounting member 54 fixed to the piano frame, not shown. The vertically disposed abstract 51 is pivotally connected to wippen 50 as at 55. An abstract guide member 56 is pivotally connected at its forward end as at 57 on a mid-portion of abstract 51, while the rear end thereof is pivoted to a block 58 fixed to member 54 as at 59.

Each of the piano keys 30 to 44 is similar to conventional piano keys, except that the width thereof is reduced, and an upstanding abutment portion is provided at the rear end thereof, as at 30A, 31A, 32A, etc.; the keys being pivoted on the usual fulcrum member 60 mounted on the piano frame, not shown, with the usual pivot pins 61 upstanding from fulcrum member 60 and passing through the usual key openings 62.

Each of the abstracts 51 is disposed in symmetrical relation to a pair of key abutment portions, as 30A, 31A; 31A, 32A; etc. The lower end of the abstract 51 terminates just short of the top surfaces 65 of the abutment portions 30A, 31A, etc. and is slotted as at 66 to receive therein a triangular shaped latch member 67. The latch member 67 is disposed with its apex 68 extending downwardly into interposed relation between a pair of adjacent abutment portions, as 30A, 31A, etc. The latch member 67 is pivoted to the arms of the slotted portion 66 of the abstract 51 at a point slightly inset from apex 68 thereof, as at 69.

It will be apparent from a consideration of FIG. 2, that in the rest position of keys 30, 31; the latch member 67 will be in a normal position with its equilateral side edges 70, 71 in symmetrical relation to the upright abstract 51 with the inner corners of abutment portions 30A, 31A of adjacent keys 30, 31 in abutting relation to the side edges 70, 71 of the latch member 67 at points adjacent apex 68 thereof.

Thus, it follows that simultaneous depression of keys 30, 31, will cause latch member 67 to retain its normal position and thereby transmit the movement of said keys to the abstract 51 and thence to wippen 50, to produce the desired note C. In the same manner, simultaneous depression of keys 31, 32, will actuate wippen 51A through its associated latch member 67A. When keys 31, 32 are depressed, while latch member 67A is retained in its normal operative position to allow abstract 51A to be raised, the raised movement of key 31 will cause its abutment portion 31A to tilt latch 67 in a counterclockwise direction about its pivot 69 to an inoperative position and out of the path of movement of the raised abutment portion 31A, see FIGS. 5, 6. Similarly, when keys 30, 31 are depressed to render latch member 67 operative, latch member 67A will be pivoted in a clockwise direction to its inoperative position allowing abutment portion 31A to pass tilted latch member 67A, see FIG. 6.

To sound C♮ while C is sounding, key 32 is depressed which in combination with already depressed key 31, will actuate abstract 51A, since latch member 67A will be effective to lift abstract 51A by reason of its elevated movement due to sliding contact of side 70A with respect to the right side of abutment portion 31A while the side 71A thereof is in contact with the top surface 65 of abutment portion 32A, see FIG. 6.

Figure 7:
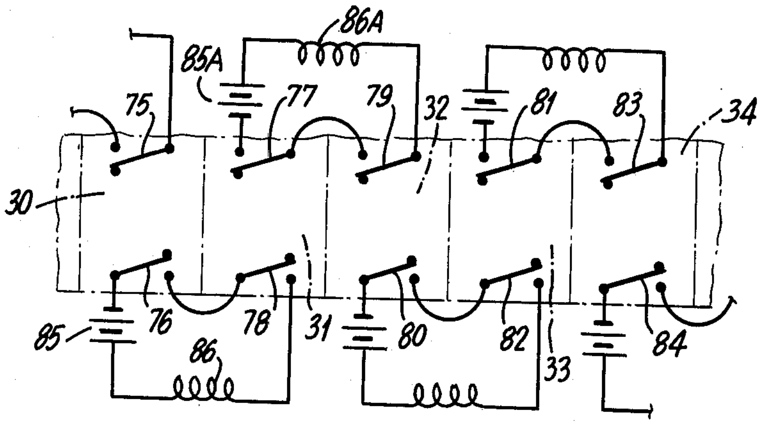
FIG. 7 is a diagrammatic view showing an alternative embodiment of the invention using electrical means for actuating the respective notes or elements by depressing keys in pairs.

Alternatively, as shown in FIG. 7, the actuation of the sound producing means or other actuatable element may be effected by electrical means. Thus, each of the keys 30, 31, 32, etc. is effective upon depression to close a pair of normally open single pole, single throw switches 75, 76; 77, 78; 79, 80; 81, 82; 83, 84; etc. Switch 76 of key 30 is connected in series with switch 78 of key 31, with an interposed current source 85 and circuit means 86 for imparting suitable movement to an abstract, not shown, to sound the corresponding note, or to operate the note producing means of an electronic type organ or to operate the solenoid controls of an electrically operated organ or other device.

Similarly, switch 77 on key 31 is connected in series with switch 79 on key 32 with an interposed current source 85A and operating circuit means 86A for actuating another note producing means not shown and thereby produce another note. It will be apparent that the indicated arrangement of paired switches and cross over connections thereof for adjacent keys, allows the keys to be depressed in pairs to produce desired notes in the manner previously described.

Figure 8:
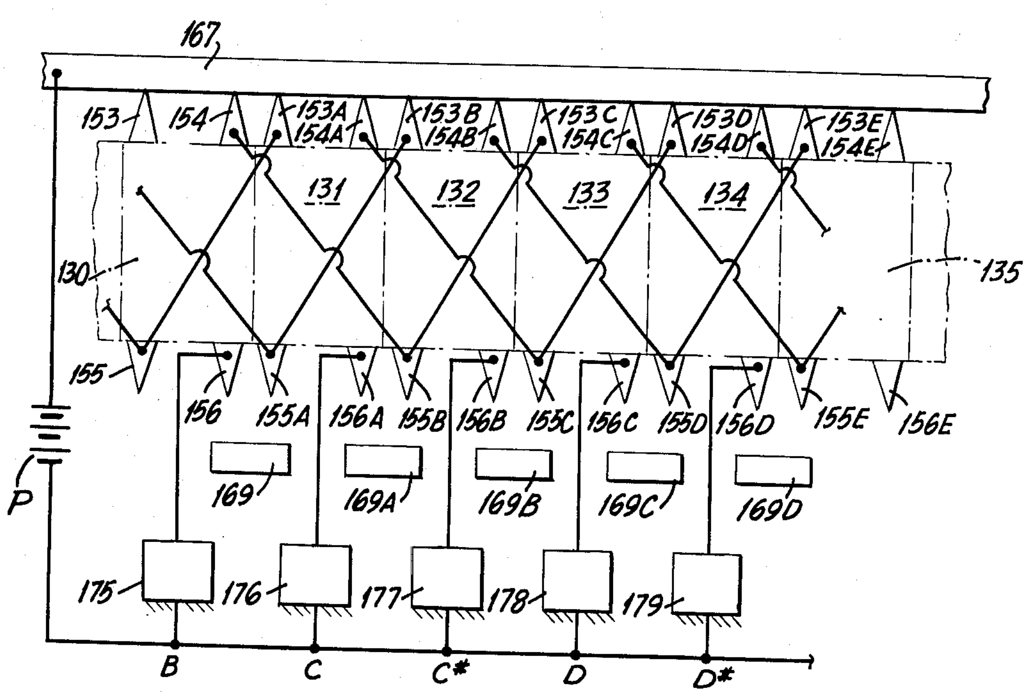
FIG. 8 is a diagrammatic showing of another embodiment of the invention including wiring utilizing electrical actuating means responsive to the depression of pairs of keys of a keyboard.
Figures 9, 9A:
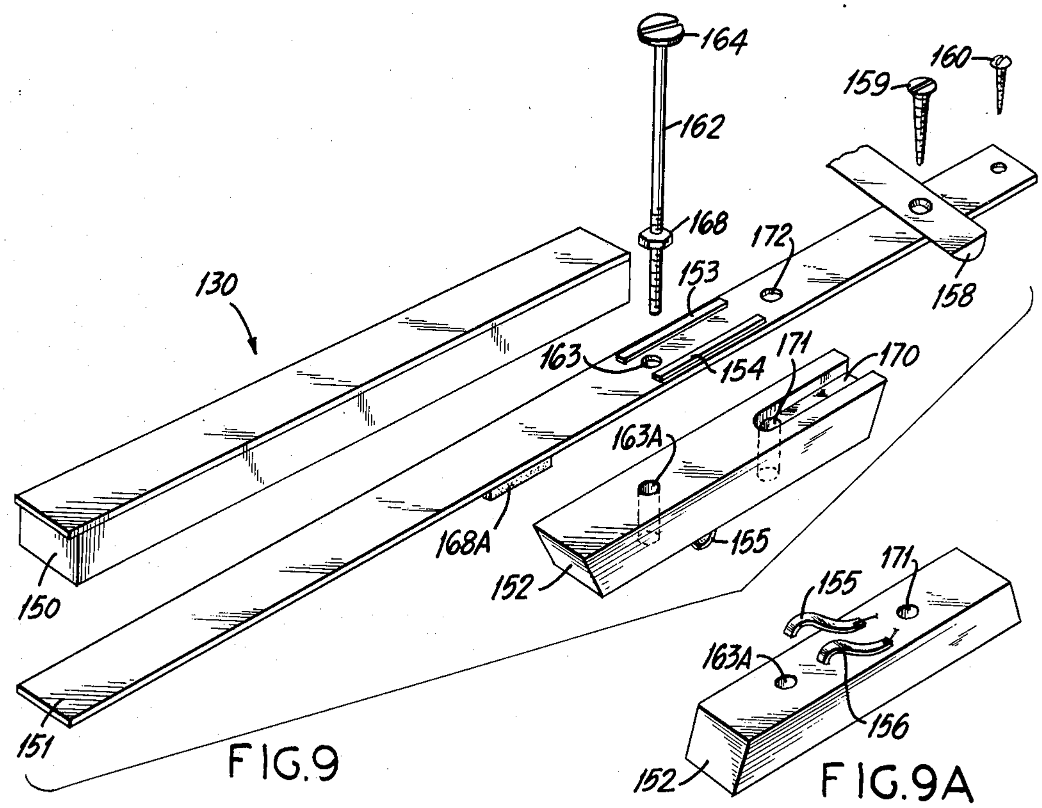
FIG. 9 is an exploded perspective view showing a single key assembly and its associated electrical and mechanical parts.
FIG. 9A is a perspective view showing the contact block element of the assembly, in an inverted position.
Figure 10:
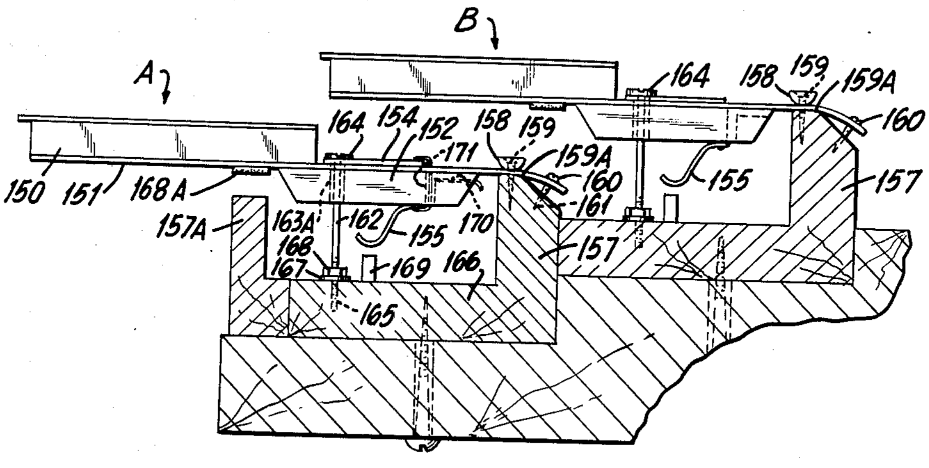
FIG. 10 is a side elevational view with parts in section, showing dual manuals incorporating the key assembly of FIG. 9.

In FIGS. 8–10 is shown still another embodiment of the invention wherein the keys of the keyboard provide selective switch means for actuating electrical circuits which are adapted to energize means for sounding note producing means or actuating selected elements of a device associated with the keyboard. More particularly, such keyboard is effective when it is desired to provide for discrimination against certain musical notes. Thus, if the intervals of a major-second were sounded, such as C and D, FIG. 1, by depressing keys 30, 31, 32 and 33 simultaneously, the note C♮ would be sounded in addition to notes C and D through the depression of keys 31, 32 as a pair corresponding to note C♮, unless note C♮ can be suppressed.

Thus, the keyboard arrangement shown in FIGS. 8–10 is effective to provide particularly for the simultaneous fingering of more than one note and further, such arrangement also allows for a plurality of adjacent manuals, each manual being constituted of a single complete set of keys in side by side relation; a second manual being located immediately behind a first manual for convenient fingering access, particularly when the second manual is slightly raised with respect to the first manual forward thereof; the thus disposed first and second manuals providing an arrangement similar to that of the natural and accidental keys in a conventional piano keyboard.

As shown in FIG. 8, the adjacent keys of keyboard 10A are shown as 130, 131, 132, etc. Each key is provided with a pair of switch contacts on the upper surface thereof and a second pair of switch contacts on lower surface portions thereof. The keys 130, 131, etc. are so mounted as to allow the upper switch contacts to make contact with a common electrical conductor, when the keys are at rest, while the lower switch contacts are bridged in selected pairs when selected keys are depressed, thus breaking an electrical circuit including the upper switch contacts and making an electrical circuit including the lower switch contacts.

As shown in FIG. 9, each key, such as key 130 comprises a touchplate 150 of non-conductive material having a flat, elongated spring 151 such as nylon secured to the bottom thereof, said spring 151 also being of non-conductive material and extending rearwardly beyond the rear edge of touch plate 150. A contact block 152 of non-conductive material such as suitable molded plastic is bonded to the underside of spring 151 at the rear thereof. The spring 151 carries on its upper surface and rearwardly of touchplate 150, a pair of parallel upper switch contacts 153, 154. The contact block 152 carries on its underside a pair of parallel lower switch contacts 155, 156 which are riveted at one end thereof and bent into arched spring form.

The keys 130, etc. are mounted on a rail 157 of the instrument frame by means of a length of half round molding 158 and screw 159 at the fulcrum edge 159A of rail 157. The tension of spring 151 is regulated by a screw 160 passing through the tail portion of said spring and into a bevelled rear portion 161 extending from fulcrum edge 159A of rail 157. The upward movement of key 130 is limited by a metal bolt 162 passing through an enlarged opening 163 in spring 151 between contacts 153, 154 and oversize bore 163A in block 152, said bolt 162 having a flat head 164 which abuts against the upper switch contacts 153, 154 when the key is at rest. The lower end of bolt 162 is screwed into a threaded recess 165 formed in a horizontal base portion 166 extending forwardly of rail 157. The bolt 162 passes through an elongated metal electrical conductor strip 167 and is locked in place by a metal nut 168. A felt pad 168A is secured to the underside of key 130 for contact upon depression of the key, with forward rail 157A.

On the bast portion 166 is provided a series of longitudinally spaced bridging contacts 169 disposed so that the adjacent pair of lower switch contacts respectively located on a pair of adjacent keys, as 130, 131, are bridged upon depression of said keys 130, 131. The contact block 152 is formed with a wiring slot 170 on its top surface and extending forwardly from its rear edge to a mid-portion thereof where said slot 170 communicates at its forward end with a vertical wiring bore 171 therein.

Thus, wiring from lower switch contacts 155, 156 is carried up through bore 171 and rearwardly in slot 170 while wiring form the upper switch contacts 153, 154 is carried rearwardly in slot 170 through an opening 172 in spring 151, see FIG. 10. The connections of the upper and lower switch contacts is made in accordance with the showing in FIG. 8, wherein conductor strip 167 is connected to one side of a power source P, and each of the lower switch contacts 156, 156A, 156B, etc. is connected in a circuit including actuating means for a given musical note.

In their raised, rest position, each of the keys 130, 131, 132, etc. has its respective pairs of upper contacts 153, 154; 153A, 154A; etc. in contact with the common conductor strip 167 by way of each bolt head 164, bolt 162 and nut 168. With the keys in such rest position, the lower contacts, paired at 156, 155A; 156A, 155B; 156B, 155C, etc. are in raised open circuit relation to their respective fixed bridging contacts 169, 169A, 169B, etc.

Furthermore, the upper and lower contacts 153, 154; 155, 156 on the keys 130, 131, 132, etc. are wired together as indicated in FIG. 8. Thus, lower contacts 156, 156A, 156B, etc. are respectively wired to one side of corresponding electrically actuated note producing or other elements, indicated generally at 175, 176, 177, 178, 179. The other sides of said elements 175, 176, 177, etc. are connected to one side of power source P, the other side of power source P being connected to common conductor 167.

The contacts on keys 130, etc. are cross wired, whereby upper contact 154 on key 130 is connected to lower contact 155B on key 132; lower contact 155 on key 130 is connected to upper contact 153A on key 131; upper contact 154A on key 131 is connected to lower contact 155C on key 133; lower contact 155B on key 132 is connected to upper contact 153C on key 153; upper contact 154B to upper contact 153C on key 133; upper contact 154B 134; lower contact 155C on key 133 is connected to upper contact 153D on key 134; upper contact 154C on key 133 is connected to lower contact 155E on key 135; lower contact 155D on key 134 is connected to upper contact 153E on key 135; etc.

Assuming for the purpose of illustration that the depressed paired keys 130, 131 produce the note B through element 175; keys 131, 132 produce C through element 176; keys 132, 133 produce C♯ through element 177; keys 133, 134 produce D through element 178 and keys 134, 135 produce D♯ through element 179; and further assuming that the performer wishes to play notes C and D simultaneously, it will be apparent that the note C♯ must be suppressed, since the simultaneous depression of keys 131, 132, 133, 134, would normally produce the note C♯, as well as notes C and D.

However, the depression of keys 131 and 132 will open the circuit between common conductor 167 and upper contacts 153A, 154A; 153B, 154B on said keys, but contact 154 on key 130 is still in contact with common conductor 167 and passes current to contact 155B; contact 155B is also connected to conductor 167 via contact 153C on key 133 when key 133 is in its normal raised position. Since lower contacts 156A, 155B are bridged by fixed contact 169A when keys 131, 132 are depressed the circuit to element 176 is closed via contact 154 on raised key 130 and the note C is sounded.

Similarly, the depression of keys 133, 134 will cause lower contact 155D to pass current from conductor 167 by way of upper contact 153E on key 135 in its raised position and the bridging lower contacts 156C, 155D by contact 169C will cause note D to be sounded by way of note producing element 178. However, the simultaneous depressed position of keys 132, 133 will not result in the sounding of note C♯ by note producing element 177 since lower contact 155C on key 133 is in open circuit because keys 131, 134 are also depressed leaving their upper contacts 154A, 153D separated from common conductor 167 and despite the bridging of lower contacts 156B, 155C by fixed contact 169B, element 177 is left in open circuit.

It will be apparent from a consideration of FIG. 8 that the wiring of the switch contacts on the adjacent keys, is such as to discriminate against an intermediate note when four adjacent keys are depressed simultaneously.

As indicated in FIG. 10, a plurality of similar manuals A and B may be arranged in successively higher tiers each manual comprising a single row of keys 130, 131, etc. and associated switch contacts, etc. as described above. Such arrangement of the manuals allows for playing keys from both manuals with a single hand since the span between keys of both manuals is relatively small. In contrast, the span between a natural key on the lower manual and the accidental key on the upper manual, in a conventional keyboard, is substantial, and two such keys could not be readily played with a single hand.

As various changes might be made in the embodiments of the invention herein disclosed without departing from the spirit thereof, it is understood that all matter herein shown or described shall be deemed illustrative and not by way of limitation except as set forth in the appended claims.

What is claimed is:

1. A keyboard comprising a single row of keys in side by side relation, elements selectively operable by said keys, means responsive to the depression of one pair of laterally adjacent keys for actuating one of said elements and means responsive to the depression of a second pair of laterally adjacent keys for actuating another of said elements, one of the depressed keys being common to said first and second pair of keys.

2. A keyboard as in claim 1 wherein said means comprises interconnected mechanical members, said members being arranged for selective interaction to actuate one element when the first set of keys is depressed and to actuate the other element when the second set of keys is depressed.

3. A keyboard as in claim 1 wherein said means comprises electrical circuitry and switch means operable in response to movement of said keys for selectively closing a first circuit for operating one element or a second circuit for operating the other element.

4. A keyboard as in claim 3 wherein said circuitry includes circuit means for suppressing the actuation of a given element when four laterally adjacent keys are depressed while allowing the actuation of a second and third element.

5. A keyboard including a row of laterally adjacent depressible keys, each key having mounted thereon a first pair of switch contacts and a second pair of switch contacts, a common electrical conductor in contact with the first pair of switch contacts of each key when said keys are in their rest position, the second pair of switch contacts being in open circuit, and a plurality of spaced contact bridging means located to respectively bridge third pairs of switch contacts taken from said second pairs of switch contacts where one of said third pairs of contacts is on one key and the other of said third pairs of contacts is on a key adjacent said one key.

6. A keyboard as in claim 5 and further including circuit means connecting one contact of the first pair of contacts on one key with one contact of the second pair of contacts on a key once removed from said first key and on one side thereof, circuit means connecting the other contact of the first pair of contacts on said one key with one contact of the second pair of contacts on a key immediately adjacent said first key and on the other side thereof, the other contact of the second pair of contacts on each key being respectively connected to one side of an electrically operable element, circuit means connecting the other sides of said electrically operable elements to a power source and said common electrical conductor.

7. A keyboard as in claim 6 and further including circuit means connecting the said one contact of the second pair of contacts on each key to the other contact of the first pair of contacts on the key immediately adjacent thereto on said one side thereof.

8. A keyboard for selective operation of a plurality of elements comprising a pair of key manuals arranged with one key manual immediately behind and slightly raised in respect to the other key manual, each manual comprising a single row of keys in side by side relation, means responsive to the depression of any given pair of laterally adjacent keys in a single manual for actuating a single element corresponding to said given pair of depressed laterally adjacent keys, said manuals being so disposed to allow the depression of a pair of laterally adjacent keys from each manual with the fingers of a single hand.

9. In combination a plurality of electrically operated elements and a keyboard comprising a single row of keys in side by side relation for selectively operating said elements, means operatively connecting each element with a pair of adjacent keys, said means comprising switch means on each key, circuit means including switch means on a first pair of keys operable in response to depression of said first pair of keys for operating a first electrically operated element associated with said first pair of keys, circuit means including switch means on a second pair of keys immediately adjacent said first pair of keys operable in response to depression of said second pair of keys for operating a second electrically operated element associated with said second pair of keys, and circuit means including switch means operable in response to simultaneous depression of said first and second pairs of keys to open a circuit including switch means on a third pair of adjacent keys including one key from each of said first and second pairs of keys and a third electrically operated element associated with said third pair of keys to suppress the operation of said third element.

10. A piano keyboard comprising a single row of piano keys including all naturals and accidentals in side by side relation, a plurality of abstracts, and means responsive to the depression of any pair of adjacent keys to actuate an abstract associated with said pair of keys.

11. A piano keyboard as in claim 1 wherein said means comprises a movable member on each abstract which is movable between operative and inoperative positions, and means on each key for engaging a movable member, said movable members being respectively located in symmetrical relation to the means on a pair of adjacent keys associated with an abstract carrying said movable member whereby simultaneous depression of said pair of keys will cause bearing engagement of the means thereon with said movable member to move said movable member to its operative position and thereby move said abstract.

12. A piano keyboard as in claim 1 wherein said means comprises electrical means for actuating each abstract, circuit means to each actuating electrical means and including a pair of switches in series relation, each switch being actuated by one of a pair of laterally adjacent keys whereby said circuit means is closed only upon simultaneous depression of said pair of keys to thereby close said pair of switches.

13. A piano keyboard having a single row of piano keys in side by side relation, a plurality of laterally adjacent abstracts, each key including at the rear end thereof abutment means, each abstract having the lower end thereof disposed in medial relation to the abutment means of a pair of adjacent keys, and means movably mounted on the lower end of each abstract for abutting relation to the abutment means on the pair of keys associated with said abstract, said movable member on the abstract being laterally displaceable in response to the depression of a single key while leaving the abstract at rest, said movable member on the abstract being retained in a normal position in response to the depression simultaneously of the pair of keys whereby the simultaneous bearing engagement of the abutment means on said pair of keys relative to said movable member causes elevation of said abstract.

14. A piano keyboard as in claim 4 wherein said movable member comprises an inverted triangular member having its apex extending downwardly between the abutment means on the pair of keys, means for pivotally mounting said triangular member adjacent the apex thereof on said abstract for pivoted movement about a horizontal axis, each of said keys upon separate depression thereof being operative to allow engagement of the abutment means thereof with one side of the triangular member to cause pivoted movement of said triangular member while simultaneous depression of said pair of keys is effective to cause simultaneous abutting engagement of the opposite sides of the triangular member by the abutment means of the respective keys of said pair of keys to thereby cause elevation of the abstract carrying said triangular member.

References Cited by the Examiner

UNITED STATES PATENTS

| | | | |
|---|---|---|---|
| 1,680,582 | 8/28 | Zidell | 84—423 |
| 1,958,227 | 5/34 | Barnett | 84—423 |

LEYLAND M. MARTIN, *Primary Examiner.*